US011200910B2

(12) United States Patent
Tran et al.

(10) Patent No.: US 11,200,910 B2
(45) Date of Patent: Dec. 14, 2021

(54) RESOLUTION OF EDIT CONFLICTS IN AUDIO-FILE DEVELOPMENT

(71) Applicant: International Business Machines Corporation, Armonk, NY (US)

(72) Inventors: Thai Quoc Tran, San Jose, CA (US); Animesh Singh, Santa Clara, CA (US); Cindy Han Lu, San Jose, CA (US); Nimesh Bhatia, San Jose, CA (US); Srinivas R. Brahmaroutu, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 229 days.

(21) Appl. No.: 16/455,881

(22) Filed: Jun. 28, 2019

(65) Prior Publication Data

US 2020/0411034 A1    Dec. 31, 2020

(51) Int. Cl.
*G10L 25/51* (2013.01)
*G06F 16/18* (2019.01)
*G06F 16/16* (2019.01)
*G06F 3/16* (2006.01)

(52) U.S. Cl.
CPC ............. *G10L 25/51* (2013.01); *G06F 3/162* (2013.01); *G06F 16/164* (2019.01); *G06F 16/1873* (2019.01)

(58) Field of Classification Search
USPC ........................................................ 707/609
See application file for complete search history.

(56) References Cited

U.S. PATENT DOCUMENTS

| 6,166,731 | A | 12/2000 | Duvall et al. |
| 8,595,377 | B1* | 11/2013 | Apgar .................. H04N 7/181 709/233 |
| 9,338,521 | B2* | 5/2016 | Cheng ................ H04N 21/2668 |
| 10,089,611 | B1* | 10/2018 | Eisher ................ G06F 21/6209 |
| 2010/0326256 | A1 | 12/2010 | Emmerson |
| 2012/0296875 | A1* | 11/2012 | Kwiatkowski ........ G06F 40/166 707/684 |
| 2012/0311448 | A1 | 12/2012 | Achour et al. |
| 2013/0238999 | A1 | 9/2013 | Helms et al. |

(Continued)

FOREIGN PATENT DOCUMENTS

| CN | 101840722 A | 9/2010 |
| CN | 102842325 B | 11/2015 |
| CN | 102855908 B | 11/2015 |

*Primary Examiner* — Cam Linh T Nguyen
(74) *Attorney, Agent, or Firm* — Peter J. Edwards (57) ABSTRACT

A processor may store a first version of an audio file and fragment the audio file into at least a first time segment. The processor may receive a first edit to the audio file and identify a first edited version of the first time segment in the first edit. The processor may update the first version of the audio file with the first edit, resulting in a second version of the audio file comprising the first edited version of the first time segment. The processor may receive a second edit to the first version of the audio file and identify a second edited version of the first time segment in the second edit. The processor may determine, based on the second edited version, that the second edit alters an outdated version of the first time segment, resulting in an edit conflict. The processor may notify a user of the conflict.

16 Claims, 4 Drawing Sheets

(56) References Cited

U.S. PATENT DOCUMENTS

| | | | |
|---|---|---|---|
| 2015/0178294 A1* | 6/2015 | Baldwin | G06F 40/197 |
| | | | 707/695 |
| 2015/0348585 A1 | 12/2015 | Pisula et al. | |
| 2017/0345459 A1* | 11/2017 | Manville | H04N 21/23439 |
| 2018/0218749 A1* | 8/2018 | Fejgin | G10L 25/18 |
| 2018/0349406 A1* | 12/2018 | Shortlidge | G06F 16/178 |
| 2020/0272409 A1* | 8/2020 | Vaidya | G06F 3/162 |

* cited by examiner

RESOLUTION OF EDIT CONFLICTS IN AUDIO-FILE DEVELOPMENT

BACKGROUND

Aspects of the present disclosure relate to development of audio files, more particular aspects relate to version control of audio files in development.

Audio files may be developed by one or more audio developers. An audio file in development may be stored on a central server. Updates to the audio file may be uploaded to the central server by audio developers working on the development project. When updates are uploaded that conflict with prior updates, one or more audio developers may be required to manually listen to each updated version in order to identify the conflicting portions and resolve the conflicts.

SUMMARY

Some embodiments of the present disclosure can also be illustrated as a method comprising storing a first version of an audio file. The method may fragment the audio file into at least a first time segment. The method may include receiving a first edit to the audio file, and identifying a first edited version of the first time segment in the first edit. The method may also include updating the first version of the audio file with the first edit, resulting in a second version of the audio file comprising the first edited version of the first time segment. The method may also include receiving a second edit to the first version of the audio file, and identifying a second edited version of the first time segment in the second edit. The method may then include determining, based on the identifying the second edited version, that the second edited version alters an outdated version of the first time segment, resulting in an edit conflict. The method may finally include notifying a user of the edit conflict.

Some embodiments of the present disclosure can also be illustrated as a computer program product comprising a computer readable storage medium having program instructions embodied therewith, the program instructions executable by a computer to cause the computer to perform the method discussed above.

Some embodiments of the present disclosure can also be illustrated as a system comprising a processor and a memory. The memory may be in communication with the processor. The memory may contain program instructions that, when executed by the processor, are configured to cause the processor to receive a first edit to an audio file and receive a second edit to the audio file. The program instructions may also cause the processor to detect an edit conflict between the first edit and the second edit. The program instructions may also cause the processor to identify a relevant user for the audio file and analyze the preferences of the identified relevant user. The program instructions may also cause the processor to edit, based on the analyzing, the audio file to resolve the edit conflict.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to development of audio files, more particular aspects relate to version control of audio files in development. While the present disclosure is not necessarily limited to such applications, various aspects of the disclosure may be appreciated through a discussion of various examples using this context.

Audio files contain media designed to be listened to by an end user, such as songs, sound effects, music tracks, and others. These audio files contain audio data that is created and developed by musicians, audio engineers, sound designers, and others (collectively referred to herein as "artists"). In some industries and use cases, the process of creating and developing a particular audio file may be an iterative process that takes place over time. For example, an artist may develop an audio file over the course of a calendar year, during which the artist may work on a first portion of the file, then work on a second portion of the file, then work on the entire file, then return to focusing on the first portion of the file.

During this iterative process, it may sometimes be beneficial to store a "master" version of the audio file on a computer, such as a server. This master version of the audio file may represent the most current, accepted version of the audio file. For example, if a musician is creating a song, the musician may store the most recent version of the song on a central server, and may create a copy of the song on a workstation computer to edit. If the musician produces an edit to the song that the musician enjoys, the musician may upload that edit (e.g., a version of the audio file that reflects the edit) to the central server. That edited version may then become the master version of the audio file. However, if the musician produces an edit to the song that the musician decides should not be incorporated into the final audio file (e.g., the musician decides the resulting song sounds harsh), the musician may simply delete the edited version of the audio file. Because the musician did not merge the edited audio file with the master version, the master version remained the most current, accepted version of the audio file.

However, version control of audio files may be difficult in some use cases. For example, if a musician is working on multiple versions of an audio file simultaneously, it may be difficult to keep track of each particular version of the audio file without listening to each version (e.g., through an audio player). Thus, edit conflicts may be likely to arise during audio-file development. An edit conflict occurs when two edits to an audio file change the master audio file in different ways. For example, an artist may produce a first edit to a copy of a master audio file that is current as of a first particular date. The first edit may change a first time segment of the audio file (e.g., minutes 2 through 4 of a song). The artist may then upload the edited audio file to a server, creating a master audio file that is current as of a second particular date.

Subsequently, the artist may move to other projects and, at a later time, return to the audio file to continue editing. Due to the passage of time, the artist may then mistakenly edit a second copy of the master audio file that was current as of the particular date, rather than the second particular date. The artist may then attempt to upload the second copy of the master audio file to the server, complete with the second edit. Depending on the nature of the second edit, this may result in several different types of edit conflict.

In the first type of edit conflict, referred to herein as a "current edit conflict," the second edit would only alter time segments that were not altered in the first edit (i.e., segments that do not overlap with the first time segment, such as minutes 5 through 6 of the song in the previous example). In other words, the second edit would only alter time segments that are current in the master audio file on the server. In theory, both edits in a current edit conflict could be applied to the master audio file simultaneously. For example, if an artist altered a first time segment (e.g., the first minute of a 10-minute song) and a second, non-overlapping time segment (e.g., the last minute of the 10-minute song), both edits could be uploaded to a master song file simultaneously.

However, in a current edit conflict, non-overlapping time segments are edited in multiple, separate edits. For example, an artist may mistakenly attempt to upload two edit files to replace the master audio file. Continuing the previous example, the first edit file may alter the first minute of the 10 minute song, but maintain the original state of the last nine minutes. The second edit may alter the last minute of the song, but maintain the original state of the first nine minutes. If the second edit is uploaded to the master audio file after the first edit, the second edit may revert the first minute of the song to the original state, nullifying the first edit.

In the second type of edit conflict, referred to herein as an "outdated edit conflict," a subsequent edit would also alter a time segment that has already been altered by a previous edit. For example, an artist may be working on an original audio file that is copied from a master audio file. The artist may alter the first 2 seconds of the original audio file in a first edit and upload that first edited audio file to the master audio file. The current master audio file would contain the altered first 2 seconds. However, in a subsequent edit, the artist may mistakenly edit the original audio file again and alter seconds 2 thorough 3 of the original audio file, resulting in a second edited audio file in which the original first 1 second is original, but seconds 2 through 3 are edited. If the artist then uploads this second edited audio file to the master audio file, an outdated edit conflict would occur. This type of edit conflict is referred to an outdated edit conflict because the artist uploaded an edit that altered an outdated version of the first 2 seconds of the audio file. In some embodiments, uploading this outdated edit conflict may revert the first second of the audio file to the original state. This may lead to undesired results if the artist prefers the first edit, or would prefer a mixture of the first edit and the second edit.

As discussed, in some instances an artist may not realize that an edit conflict (either a current edit conflict or an outdated edit conflict) occurs, and may overwrite pervious work performed when merging an edited audio file with a master audio file. However, in some instances an artist may realize (e.g., when attempting to upload an edited audio file) that uploading the file would result in an edit conflict. In these instances, the artist may be required to listen to both versions of the audio file (i.e., the previously edited master audio file and the currently edited audio file) to identify conflicting time segments. When working on long or complex audio files (e.g., a song or a recording of a speech), this may be very time consuming. Time spent identifying conflicting time segments in an audio file may, in some instances, be time that an artist would have been able to spend working on other areas of a project (or other projects), and thus may be very costly from an operational-cost perspective. For example, in a current edit conflict, an artist may determine that a first edit altered the $1^{st}$ minute of a song and that a second edit altered the $4^{th}$ minute of the song. Even though the artist would be able, in theory, to merge both edits into a master audio file containing the edited $1^{st}$ and $4^{th}$ minutes, the time the artist spent identifying the conflicting segments could have been better spent elsewhere on the project (e.g., altering the $8^{th}$ minute of the song).

Further, in the case of an outdated edit conflict, the artist may be required to spend even more time determining how to merge two independently edited and overlapping time segments. For example, an artist may realize that two edits independently edited the first 2 minutes of a song. After identifying the outdated edit conflict and listening to both edited versions of the first 2 minutes of the song, the artist may prefer minute 1 of the first edit and minute 2 of the second edit. However, minute 1 of the first edit may not transition well to minute 2 of the second edit, requiring the artist to perform more work to determine a desirable way to merge the edits together (e.g., create a short transition segment between minute 1 and minute 2).

For the reasons discussed above, edit conflicts may be particularly costly in the development of audio files. Further, outdated edit conflicts may be even more costly if they result in more required work to merge two conflicting edits.

In some industries and use cases, version tracking of audio files may be more complicated when multiple artists add to the development of an audio file simultaneously. For example, a team of sound engineers may be responsible of developing a set of background sound effects or background music for an advertisement. Thus, multiple artists may be working on the same audio file at the same time. This may result in a significant increase in edit conflicts throughout the project because multiple artists may be creating edits to different copies of the same version of an audio file simultaneously. For example, if three artists all copy an original version of a master audio file to their workstations, the first artist may edit minutes 1 through 3 and 5 through 6 of the audio file, the second artist may edit minutes 2 through 4 of the audio file, and the fifth artist may edit minutes 3 through 5 of the audio file. This may result in several edit conflicts if all artists decide to upload their edited versions to the master audio file.

In some industries, audio projects that employ a high number of artists may also be particularly expensive projects. For that reason, while it may be more likely for edit conflicts to occur during audio projects that employ a high number of artists, edit conflicts in those projects may be particularly costly.

Embodiments of the present disclosure mitigate the negative effects of edit conflicts in audio development projects. In some embodiments of the present disclosure, a master audio file may be stored on a central. That master audio file may be broken up into time segments. The nature of those time segments may vary by the embodiment and use case. For example, in an embodiment in which a 10-minute song is being developed, the song may be divided into ten 1-minute segments. However, in an embodiment in which a 3-second sound effect is being created, the sound effect may be broken up into thirty 0.1 second segments. In some embodiments, segments may be of unequal size. For example, in an embodiment in which a recording of two people having a conversation is being edited, the length of each segment may be based on the content of the conversation (e.g., each sentence may be a segment, or a new segment may be created each time the recording switches from one person speaking to the other person speaking).

In some embodiments, the length of segments of a master audio file may be altered each time an edit to the master audio file is uploaded. For example, a song may have a segment that begins and ends at the beginning and ending of a guitar solo (e.g., a "guitar-solo segment"). If an artist uploads an edit to the master song file that shortens the guitar solo, the length of the guitar-solo segment may be shortened as well.

In some embodiments, segments may be calculated in real time when an artist uploads an edited audio file to a central server that contains the current master audio file. For example, a processor may perform waveform or spectrogram analysis on the edited audio file to divide the audio file into segments based on the waveform or spectrogram patterns of the audio file. Continuing the previous example, a processor may perform waveform analysis on an edited song file and identify the beginning and end of the guitar solo because the waveform patterns contributed by other instruments of the song abruptly stop at the beginning of the guitar solo and abruptly start at the end of the guitar solo. Upon identifying the guitar solo, the processor may create a separate segment for the guitar solo (e.g., the guitar-solo segment). In some embodiments, the processor may perform waveform or spectrogram analysis on the master audio file to identify corresponding segments in the master audio file.

In some embodiments, segments may be labeled (e.g., tagged with metadata) during the editing process. For example, when a master audio file is originally created, the audio file may be broken up into segments and a unique metadata tag may be attached to each segment. The metadata tags may remain attached to segments when the audio file is copied to the workstations of artists on the project. Further, they may remain attached to segments during the editing process. For example, if a "guitar-solo" tag is attached to the guitar-solo segment, the tag may remain attached to the guitar-solo segment after an artist edits the guitar-solo segment.

In some embodiments, a system may label a segment with a note that identifies the last time the segment was edited. For example, a central server may maintain a master audio file fragmented into segments. Each segment may have a timestamp attached to it (for example, in a metadata tag) that identifies the last time that segment was updated. These timestamps may be referred to herein as edit timestamps. When an artist copies the master audio file to the artist's workstation, the edit timestamp information may transfer with the audio file. Then, when an artist uploads an edited audio file that edits a segment in the master audio file, the master audio file may update the edit timestamp of the segment in the master audio file.

In some embodiments, edit timestamps may be useful in identifying outdated edit conflicts by analyzing the edit timestamps of edited segments. If, for example, two artists copy an original master audio file, the edit timestamps of all segments may equal the date and time at which the original master audio file was fragmented. If a first artist then uploads an edited file that alters the original first segment in the audio file, the edit timestamp in the master audio file may be updated to equal the date and time that the edited file was uploaded. If the second artist then uploads an edited file that also alters the original first segment in the audio file, an edit conflict would occur. The edit timestamp of the first segment in the master audio file could then be compared to the edit timestamp of the first segment in the edited audio file. Because the edit timestamp of the edited segment would be older than the edit timestamp of the master segment, it would be evident that the second artist was uploading an edit to a segment that is no longer current, causing an outdated edit conflict.

Figure 1:
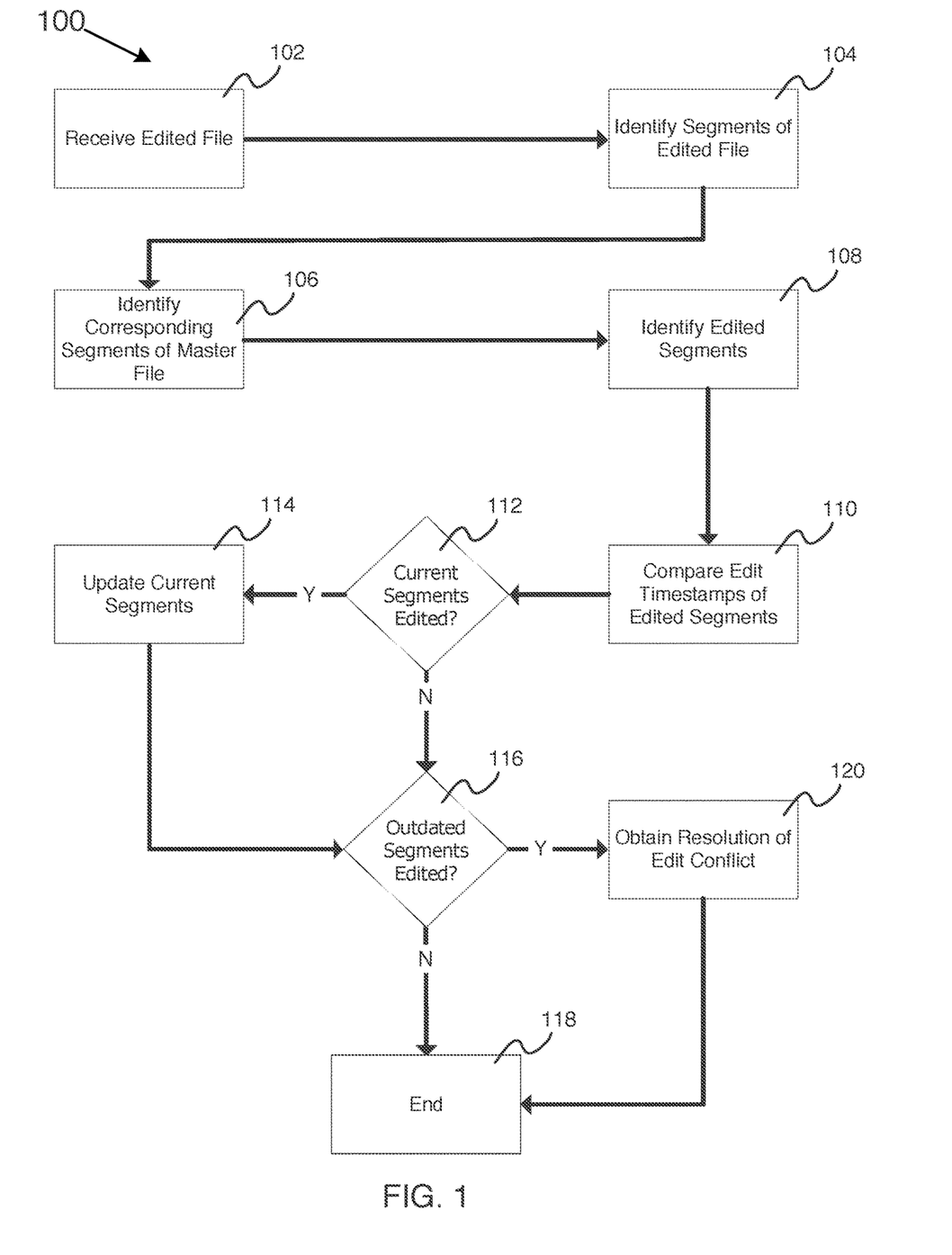
FIG. 1 illustrates an example method of analyzing edited audio segments to mitigate the negative effects of edit conflicts in an audio development project, in accordance with embodiments of the present disclosure.

FIG. 1 illustrates an example method 100 of analyzing edited audio segments to mitigate the negative effects of edit conflicts in an audio development project. Method 100 may be performed, by example, by a processor on a computer that maintains a master audio file (e.g., a central server) or a processor connected to such a computer (e.g., the personal workstation of an artist who uploads edited audio files to a central server).

Method 100 begins with block 102, in which an edited audio file is received. In some embodiments, the edited audio file may be received in block 102 by a central server that maintains a master audio file. In other embodiments, the edited audio file may be received in block 102 by a processor running a set of instructions that are configured to cause the processor to analyze the edited audio file before being uploaded to a central server (for example, when an artists workstation contains an analysis program that analyzes audio files before merging them with the master audio file).

After the processor receives the edited audio file, the processor identifies, in block 104, the segments of the edited audio file. In some embodiments, block 104 may include fragmenting the edited audio file into segments. For example, the processor may perform waveform analysis on the edited audio file to identify logical locations for the beginnings and ends of segments. In other embodiments, the processor may scan metadata tags attached to segments of the edited audio file. In yet other embodiments, the processor may divide the audio file into an equal number of segments based on the length of the audio file, without performing any further analysis (e.g., the processor may divide the audio file into 10 equal segments).

In block 106, the processor identifies segments of the master audio file that correspond to the segments of the edited audio file that were identified in block 104. In some embodiments, this may include fragmenting the master audio file into segments. For example, the processor may perform spectrogram analysis on the master audio file to identify logical locations for the beginnings and ends of segments. In some embodiments, the master audio file may have already been fragmented into segments. Once the segments of the master audio file are identified, the processor may attempt to match each segment in the edited audio file with a corresponding segment in the master audio file, creating segment pairs. For example, the processor may perform waveform analysis on the segments of both files to identify similar waveform patterns, identify segments of similar (or identical) length, or identifying segments with matching metadata tags.

Once the corresponding segment pairs are identified, the processor identifies the segments that were edited by the artist in block 108. For example, the processor may analyze the two segments in each segment pair to identify differences between the two segments. Further, block 108 may also involve identifying segments that have been added by an edited audio file (e.g., segments in the edited audio file with no corresponding segment in the master audio file) or segments that have been deleted by an edited audio file (e.g., segments in the master audio file with no corresponding segment in the edited audio file).

In some embodiments, an artist may be capable of informing the processor of the identities of the segments that the artist has edited. For example, an artist may edit a guitar-solo segment in a song, and upload the resulting edited file to a server maintaining a master-audio file. Upon uploading the edited file, the artist may identify attach a "currently edited" meta-data tag to the guitar-solo segment that informs the server that the artist edited the guitar-solo segment. In such embodiments, the processor of the server may identify that the guitar-solo segment is the only edited segment by detecting that the guitar-solo segment is the only segment with a currently edited meta-data tag.

In some embodiments, after the processor identifies the edited segments in block 108, the processor may separate the edited segments in the edited audio file from the non-edited segments in the edited audio file. In some embodiments, the processor may discard the non-edited segments of the edited audio file.

Once the edited segments are identified in block 108, the processor compares edit timestamps of the edited segments in the edited audio file with the edit timestamps of the corresponding master-file segments in block 110. The processor may identify segments for which the edit timestamps in the edited audio file are equal to the edit timestamps of the corresponding master-file segments, and may identify segments for which the edit timestamps of the edited audio file are older than the edit timestamps of the corresponding master-file segments.

Once the processor compares the edit timestamps in block 110, the processor determines in block 112 whether any of the edited segments reflect alterations to current segments. The processor may accomplish this by determining whether block 110 identified any segments for which the edit timestamps in the edited audio file matched the edit timestamps of the master audio file. If the processor determines in block 112 that no edited segment contains alterations to a current segment, then the processor proceeds to block 116.

If, however, the processor determines in block 112 that one or more edited segments reflect alterations to one or more current segments, the processor proceeds to update those segments in block 114. In some embodiments, this may entail replacing the corresponding segments in the master audio file with the edited segments in the edited audio file. In some embodiments, blocks 112 and 114 may be useful in identifying and resolving current edit conflicts, without a need to alert an artist or other user of the edit conflict. In these embodiments, significant artist time may be saved by avoiding the need for artist to detect and resolve current edit conflicts.

After the processor updates the current segments in block 114, the processor proceeds to block 116. In block 116, the processor determines whether any of the edited segments reflect alterations to outdated segments. The processor may accomplish this by determining whether block 110 identified any segments for which the edit timestamps in the edited audio file were older than the edit timestamps of the master audio file. If the processor determines in block 116 that no edited segment contains alterations to an outdated segment, the processor ends method 100 in block 118.

If, however, the processor determines in block 116 that at least one edited segment contains an alteration to an outdated segment, an edit conflict is detected, and the processor proceeds to obtain the resolution of the edit conflict. The nature of obtaining resolution of the edit conflict may vary depending on the embodiment and the circumstances. For example, in some embodiments, the processor may first alert the user who uploaded the edited file in block 102 of the conflict, at which point the user may analyze the conflicting segments (e.g., by listening to both segments and providing a resolution to the processor).

In some instances, for example, block 116 may detect an edit conflict because a first artist uploaded an edited file with an original segment (e.g., a segment that, in the first artist's edited file, reflected the condition of the segment as it existed when the master audio file was created), but a second artist had previously edited that segment and uploaded the edited segment to the master audio file. In this circumstance, the processor may identify the original segment in the first artist's original file as a subsequent edit to second artist's uploaded segment in the master audio file. In some embodiments, the processor may then notify the first artist of the conflict and ask the first artist for a resolution. In other words, in some embodiments the processor may detect that the first artist is attempting to edit the segment that was previously edited by the second artist, and notify the first artist of the conflict. The first artist may then realize that the second artist had edited the segment, and resolve the conflict by selecting the second artist's edited segment.

As discussed in connection with block 108, in some embodiments an artist may attach a metadata edit flag to the segments in an audio file that that artist has edited. In these embodiments, it is less likely that the processor would identify edit conflicts in block 116 that resulted from an artist uploading a non-edited version of a segment that was previously edited by another artist. This is because those segments would likely not be flagged as edited by the artist, and thus would not be likely to be identified as edited in block 108.

Therefore, in embodiments in which a metadata edit flag is attached to edited segments by an artist, block 116 may be more likely to detect only outdated edit conflicts. This may be beneficial, as it may prevent artists from being notified, in block 120, of edit conflicts that occur simply due to an artist uploading unedited segments.

In some embodiments, the resolution obtained in block 120 may be obtained from a machine-learning process, such as a neural network, that is trained to create desirable mergers between conflicting edits to an audio file based on learned preferences of relevant end users. An example of such an embodiment is given in more detail in FIG. 3.

In some embodiments, once the resolution of the conflict is obtained in block 120, the processor can act upon the resolution. This may involve replacing the master-file segment with the edited segment, discarding the edited segment, creating a new segment that merges the master-file segment and the edited segment, or others. After the resolution, method 100 ends in block 118.

FIGS. 2A through 2D illustrate simplified graphical representations 200A through 200D (referred to herein as "graphs") of four stages of an audio file to aid in understanding of the embodiments of the present disclosure. In Graphs 200A though 200D, X axis 202 represents the passage of time in an audio file (e.g., the playback time of a song). Y axis 204 represents a measurable, editable property of the audio data, such as amplitude at a given frequency. For ease of understanding, Graphs 200A through 200D are simplified presentations. In practice, spectrograms in which the Y axis represents frequency and the brightness/color of the graph at a given X-Y coordinate may represent amplitude of that frequency at that time.

Figure 2A:
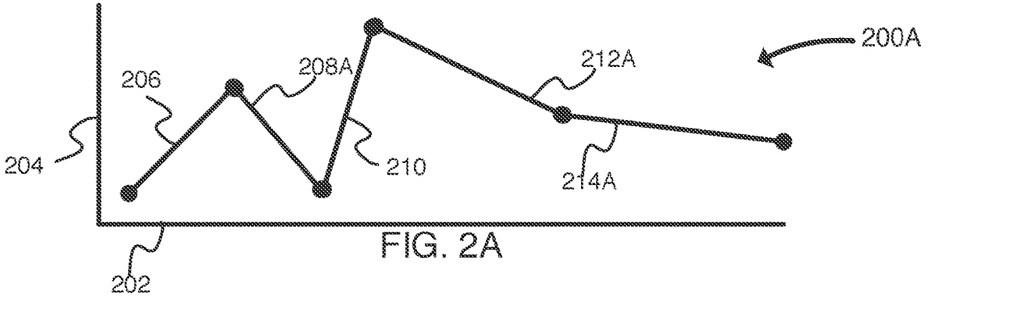
FIG. 2A illustrates a graphical representation of an original master audio file stored on a central server, in accordance with embodiments of the present disclosure.
Figure 2B:
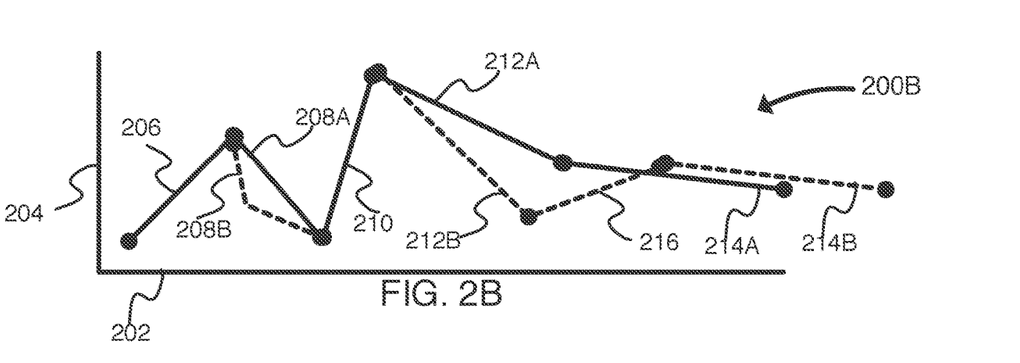
FIG. 2B illustrates a graphical representation of the audio data of an edited audio file uploaded by an artist, in accordance with embodiments of the present disclosure.
Figure 2C:
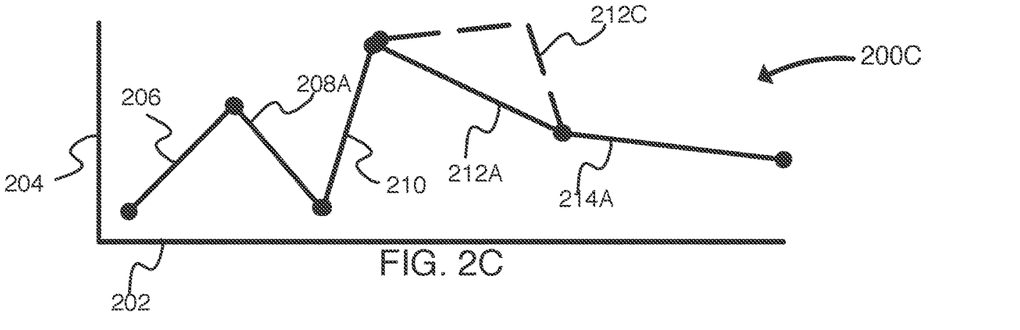
FIG. 2C illustrates a graphical representation of an edit to an original audio file that results in an edit conflict; in accordance with embodiments of the present disclosure.
Figure 2D:
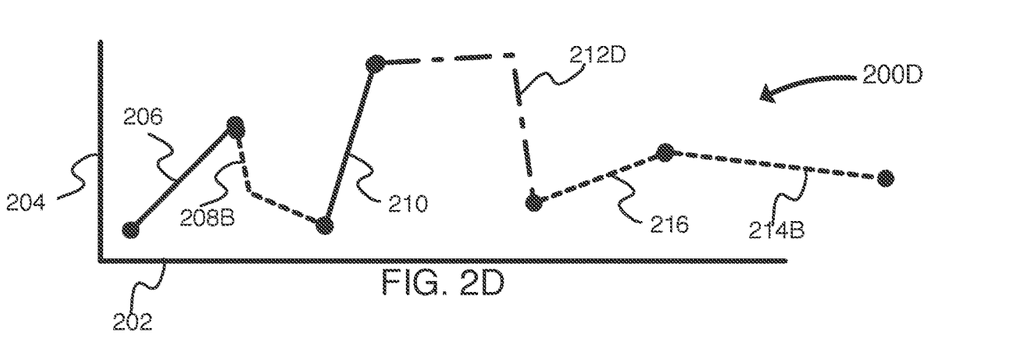
FIG. 2D illustrates a graphical representation of a resolution to an edit conflict.

Graph 200A represents an original master audio file stored on a central server. Segments 206, 208A, 210, 212A, and 214A represent identified fragmented segments in the audio file. In some embodiments, for example, these fragmented segments may be identified by spectrogram analysis and labeled with a metadata tag. In other embodiments, an artist may have manually fragmented the audio file into segments when the original master audio file was created. Segments 206, 208A, 210, 212A, and 214A are illustrated with black dots on each end of each line to signify the beginning and end of the segment. To ease in understanding, segments 206, 208A, 210, 212A, and 214A are all shown as straight lines. This is solely to simplify the presentation, and is not intended to limit the embodiments of this disclosure in any way. As is shown in FIGS. 2B through 2D, a time segment may also be presented as a non-straight line, which is also for the purposes of presentation.

Graph 200B represents the audio data of an edited audio file uploaded by an artist. Segment 208B represents the artist's altered version of segment 208A. The curved nature of segment 208B may be, for example, because the artist felt an edit to segment 208A was necessary, but desired to keep beginning of segment 210 unedited. Thus, the artist may have altered segment 208A, but caused the resulting edited segment to rejoin with segment 210.

Segment 212B represents the artist's edit to segment 212A. As can be seen in FIG. 2B, edited segment 212B is slightly shorter in time than original segment 212A. Segment 216 is an added segment that was not in the original master audio file, as can be seen by FIG. 2A. In addition, in order to accommodate new segment 216, it appears that the artist shifted segment 214B to a later point in the audio file, potentially extending the length of the audio file.

In some embodiments, the edits displayed by graph 200B may be accepted into a master audio file when the edits are uploaded. This is because there may be no edit conflicts (for example, if this is the first edit uploaded by an artist).

However, graph 200C of FIG. 2C represents a subsequent edit to a second copy of the original audio file (e.g., a second edit to the data represented by graph 200A). As is illustrated, the only alteration made in this edited audio file is represented by segment 212C. Segment 212C represents an edited version of segment 212A. In some embodiments, this edited segment may be uploaded by a second artist. In other embodiments, however, this edited segment may be uploaded by the same artist that uploaded the data represented by graph 200B.

Upon being uploaded, graph 200C may trigger an outdated edit conflict. This is because the alterations to segment 212C rely upon segments 212A and 214A, outdated segments; segment 212C begins where segment 212A ended and where segment 214A began. However, the current master file of the audio file includes segment 212B, which shifted the end of the segment to earlier in the audio file. The current master file also includes segment 214A, which shifted segment 214A to later in the audio file. In the case that the uploading of segment 212C results in an edit conflict, an artist working on the project (e.g., the artist who uploaded graph 200C) may be notified and provide a resolution. In other embodiments, the system may utilize a machine-learning system to create a solution based upon learned preferences of the artists working on the project and their end users.

Graph 200D of FIG. 2D represents a resolution to the edit conflicts resulting from the edits illustrated by 2B and 2C. As shown, graph 200D maintained edited segment 208B in the master audio file. This may be because, for example, an artist listened to both segments 208A and 208B and preferred segment 208B. This may also be because the system recognized that Segment 208A was not altered in the edits represented by graph 200C (for example, because the artist did not attach an edit flag to segment 208A, and the system did not identify it as edited, or because the artist was notified of the edit conflict, listened to both segment 208A and 208B, and preferred 208B.

Segment 212D, however, represents a merger of segments 212B and 212C. Segment 212D may be created, for example, after a notified artist listened to segments 212B, 216, and 214A and to segments 212C and 214A. The notified artist may have preferred the first section of segment 212C, but also desired to keep segment 216. Thus, the artist may have created segment 212D to merge segment 212C into the edits that created segment 216 and shifted segment 214B.

In some descriptions of some embodiments of the present disclosure, users, such as artists, are notified in the event of an edit conflict. In some embodiments, those notified users may provide a resolution to the conflict, such as selecting between two edited segments, or merging two edited segments into a third edited segment. However, in some embodiments a machine-learning system, such as a neural-network classifier, can be utilized to resolve edit conflicts.

Figure 3:
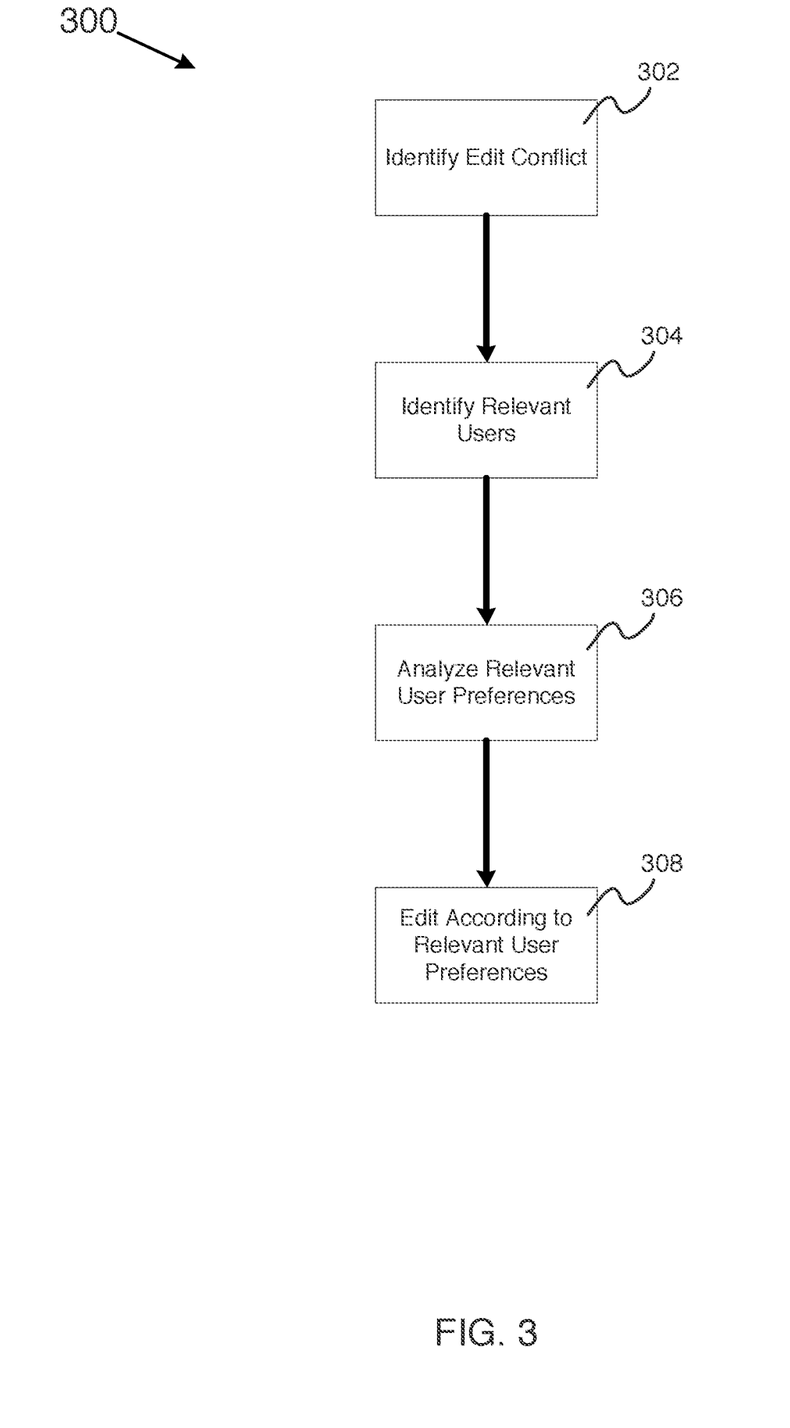
FIG. 3 illustrates an example method in which a machine-learning system may be utilized to resolve edit conflicts during the development of an audio file.

FIG. 3 illustrates an example method 300 in which a machine-learning system may be utilized to resolve edit conflicts during the development of an audio file. The machine-learning system may be, for example, located on a central server that maintains a current master audio file, or may be located on a second computer connected to the central server.

Method 300 begins with block 302 in which an edit conflict is identified. This identification could be performed in any way consistent with the embodiments of this disclosure, such as those described in method 100. Once an edit conflict is identified, the machine-learning system identifies users whose audio preferences are relevant to resolving the conflict. The types of relevant users may differ based on the embodiment and use case. For example, in some embodiments a relevant user may be an lead artist, such as a musician whose name is publicly attached to a song in development. In other embodiments, the relevant user may be a lead sound designer that is the head of an audio-development project. In other embodiments, the relevant users may be the end users of the audio file, such as the general public who will listen to a song in development.

Once relevant users are identified, the preferences of the users are analyzed in block 306 to identify patterns that may be relevant to resolving the edit conflict identified in block 302. If, for example the relevant user is a musician, the system may analyze songs by that musician to identify patterns in the musician's music. If, on the other hand, the relevant user is a lead sound designer, the system may analyze past resolutions that that sound designer (or other sound designers) have made in response to edit conflicts. The system may attempt to identify patterns in those past resolutions that could be applied to the current identified edit conflict. If, on the other hand, the relevant users are the general public, the system may identify popular relevant songs (e.g., popular songs in the same genre as the song in development) and analyze those songs for patterns that could be applied to the identified edit conflict.

Finally, once the relevant user preferences are analyzed, the system edits the master sound file in block 308 according to those preferences in a way that resolves the edit conflict. In some embodiments, this may entail selecting a segment between two conflicting segments that is more in line with the relevant user(s) preferences. In some embodiments, this may also include adding new segments help implement artist-supplied edits into a master audio file. In some embodiments, this may include altering a conflicting segment to align it more closely with the preferences of the relevant user(s).

Figure 4:
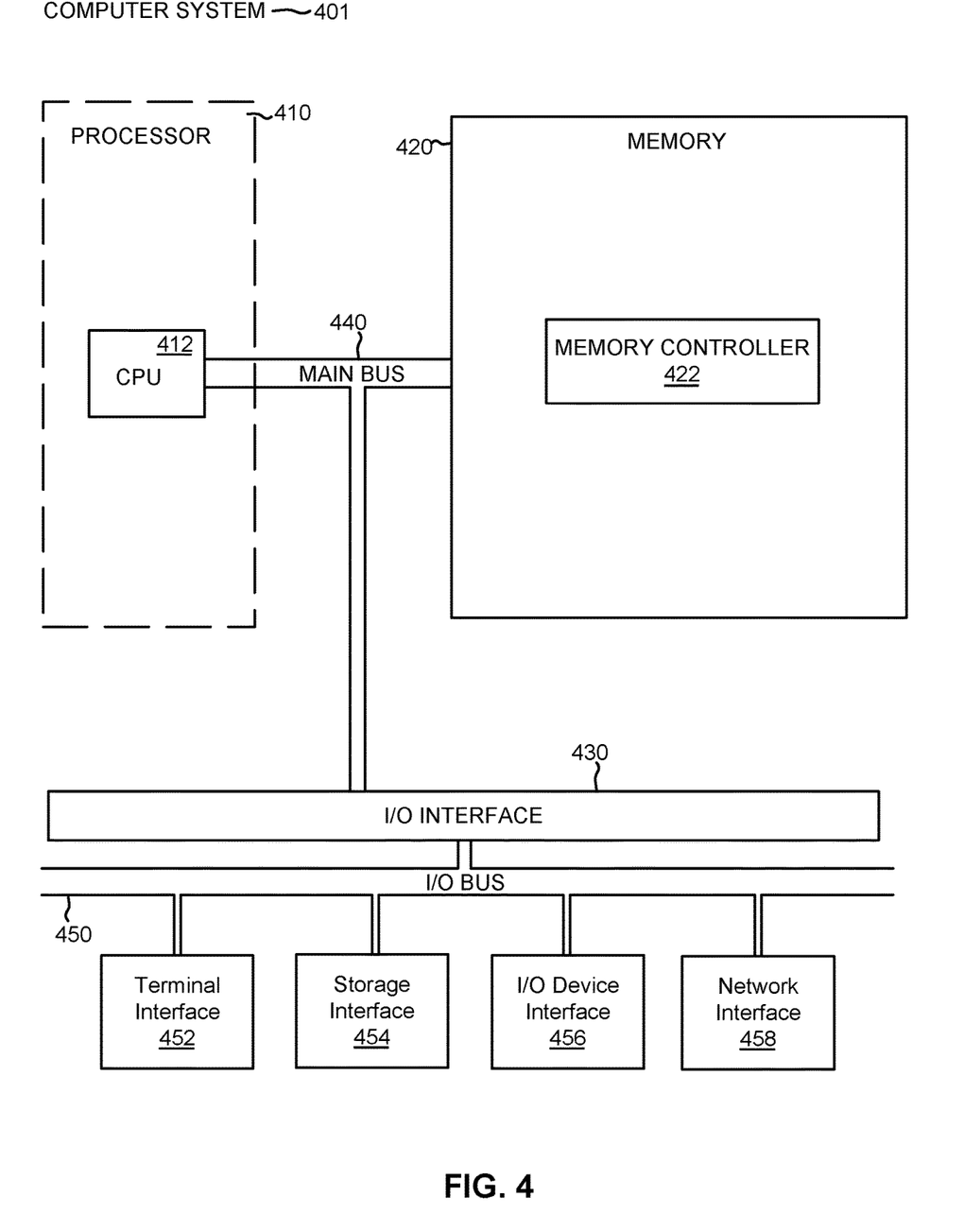
FIG. 4 depicts the representative major components of a computer system that may be used in accordance with embodiments.

FIG. 4 depicts the representative major components of an example Computer System 401 that may be used in accordance with embodiments of the present disclosure. The particular components depicted are presented for the purpose of example only and are not necessarily the only such variations. The Computer System 401 may include a Processor 410, Memory 420, an Input/Output Interface (also referred to herein as I/O or I/O Interface) 430, and a Main Bus 440. The Main Bus 440 may provide communication pathways for the other components of the Computer System 401. In some embodiments, the Main Bus 440 may connect to other components such as a specialized digital signal processor (not depicted).

The Processor 410 of the Computer System 401 may include one or more CPUs 412. The Processor 410 may additionally include one or more memory buffers or caches (not depicted) that provide temporary storage of instructions and data for the CPU 412. The CPU 412 may perform instructions on input provided from the caches or from the Memory 420 and output the result to caches or the Memory 420. The CPU 412 may include one or more circuits configured to perform one or methods consistent with embodiments of the present disclosure. In some embodiments, the Computer System 401 may contain multiple Processors 410 typical of a relatively large system. In other embodiments, however, the Computer System 401 may be a single processor with a singular CPU 412.

The Memory 420 of the Computer System 401 may include a Memory Controller 422 and one or more memory modules for temporarily or permanently storing data (not depicted). In some embodiments, the Memory 420 may include a random-access semiconductor memory, storage device, or storage medium (either volatile or non-volatile) for storing data and programs. The Memory Controller 422 may communicate with the Processor 410, facilitating storage and retrieval of information in the memory modules. The Memory Controller 422 may communicate with the I/O Interface 430, facilitating storage and retrieval of input or output in the memory modules. In some embodiments, the memory modules may be dual in-line memory modules.

The I/O Interface 430 may include an I/O Bus 450, a Terminal Interface 452, a Storage Interface 454, an I/O Device Interface 456, and a Network Interface 458. The I/O Interface 430 may connect the Main Bus 440 to the I/O Bus 450. The I/O Interface 430 may direct instructions and data from the Processor 410 and Memory 420 to the various interfaces of the I/O Bus 450. The I/O Interface 430 may also direct instructions and data from the various interfaces of the I/O Bus 450 to the Processor 410 and Memory 420. The various interfaces may include the Terminal Interface 452, the Storage Interface 454, the I/O Device Interface 456, and the Network Interface 458. In some embodiments, the various interfaces may include a subset of the aforementioned interfaces (e.g., an embedded computer system in an industrial application may not include the Terminal Interface 452 and the Storage Interface 454).

Logic modules throughout the Computer System 401—including but not limited to the Memory 420, the Processor 410, and the I/O Interface 430—may communicate failures and changes to one or more components to a hypervisor or operating system (not depicted). The hypervisor or the operating system may allocate the various resources available in the Computer System 401 and track the location of data in Memory 420 and of processes assigned to various CPUs 412. In embodiments that combine or rearrange elements, aspects of the logic modules' capabilities may be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:

storing a first version of an audio file;

fragmenting the audio file into at least a first time segment;

receiving a first edit to the audio file;

identifying a first edited version of the first time segment in the first edit;

updating the first version of the audio file with the first edit, resulting in a second version of the audio file comprising the first edited version of the first time segment;

receiving a second edit to the first version of the audio file;

identifying a second edited version of the first time segment in the second edit;

determining, based on the identifying the second edited version, that the second edit alters an outdated version of the first time segment, resulting in an edit conflict;

identifying a relevant user for the audio file, wherein the relevant user is a musician;

analyzing preferences of the identified relevant user, wherein the analyzing comprises analyzing publicly available songs released by the musician; and editing, based on the analyzing, the audio file to resolve the edit conflict.

2. The method of claim 1, further comprising:
receiving a third edit to the second version of the audio file; and
determining that the third edit resolves the edit conflict;
wherein the editing comprises updating the second version of the audio file with the third edit, resulting in a third version of the audio file.

3. The method of claim 1, wherein the fragmenting comprises labeling each time segment with a unique meta-data tag.

4. The method of claim 1, further comprising:
labeling, at the time of the fragmenting, the first time segment with a first edit timestamp;
labeling, at the time of the updating, the first edited version of the first time segment with a second edit timestamp;
wherein the determining that the second edit alters an outdated version of the first time segment comprises:
determining that the first edited version of the first time segment in the second version of the audio file comprises the second edit timestamp;
determining that the second edited version of the first time segment comprises the first edit timestamp; and
determining that the first edit timestamp is older than the second edit timestamp.

5. The method of claim 1, wherein the identifying the first edited version of the first time segment comprises detecting that the first edited version of the first time segment is labeled with an edit meta-data tag.

6. The method of claim 1, further comprising:
identifying a first edited version of a second time segment in the second edit;
determining, based on the identifying the first edited version of the second time segment, that the second edit alters a current version of the second time segment; and
updating the second version of the audio file, resulting in a third version of the audio file comprising the first edited version of the second time segment.

7. The method of claim 1, wherein the identifying a first edited version of the first time segment comprises:
identifying a first set of segments in the stored audio file;
determining that the first edited version of the first time segment corresponds to an original version of the first time segment in the first version of the audio file; and
detecting that the first edited version of the first time segment is not identical to the original version of the first timestamp.

8. A system comprising:
a processor; and
a memory in communication with the processor, the memory containing program instructions that, when executed by the processor, are configured to cause the processor to perform a method, the method comprising:
receiving a first edit to an audio file;
receiving a second edit to the audio file;
detecting an edit conflict between the first edit and the second edit;
identifying a relevant user for the audio file, wherein the relevant user is the general public;
analyze preferences of the identified relevant user, wherein the analyzing comprises:
identifying a set of songs that are popular with the general public; and
analyzing the songs in the set of songs; and
edit, based on the analyzing, the audio file to resolve the edit conflict.

9. The system of claim 8, further comprising identifying a genre of the audio file, wherein each song in the set of songs comprises the genre.

10. A computer program product, the computer program product comprising a computer readable storage medium having program instructions embodied therewith, the program instructions executable by a computer to cause the computer to:
store a first version of an audio file;
fragment the audio file into at least a first time segment;
receive a first edit to the audio file;
identify a first edited version of the first time segment in the first edit;
update the first version of the audio file with the first edit, resulting in a second version of the audio file comprising the first edited version of the first time segment;
receive a second edit to the first version of the audio file;
identify a second edited version of the first time segment in the second edit;
determine, based on the identifying the second edited version, that the second edit alters an outdated version of the first time segment, resulting in an edit conflict;
identify a relevant user for the audio file wherein the relevant user is a musician;
analyze preferences of the identified relevant user, wherein the analyzing comprises analyzing publicly available songs released by the musician; and
edit, based on the analyzing, the audio file to resolve the edit conflict.

11. The computer program product of claim 10, wherein the program instructions further cause the computer to:
receive a third edit to the second version of the audio file;
determine that the third edit resolves the edit conflict; and
wherein the editing comprises updating the second version of the audio file with the third edit, resulting in a third version of the audio file.

12. The computer program product of claim 10, wherein the fragmenting comprises labeling each time segment with a unique meta-data tag.

13. The computer program product of claim 10, wherein the program instructions further cause the computer to:
label, at the time of the fragmenting, the first time segment with a first edit timestamp;
label, at the time of the updating, the first edited version of the first time segment with a second edit timestamp;
wherein the determining that the second edit alters an outdated version of the first time segment comprises:
determine that the first edited version of the first time segment in the second version of the audio file comprises the second edit timestamp;
determine that the second edited version of the first time segment comprises the first edit timestamp; and
determine that the first edit timestamp is older than the second edit timestamp.

14. The computer program product of claim 10, wherein the identifying the first edited version of the first time segment comprises detecting that the first edited version of the first time segment is labeled with an edit meta-data tag.

15. The computer program product of claim 10, wherein the program instructions further cause the computer to:
identify a first edited version of a second time segment in the second edit;
determine, based on the identifying the first edited version of the second time segment, that the second edit alters a current version of the second time segment; and update the second version of the audio file, resulting in a third version of the audio file comprising the first edited version of the second time segment.

16. The computer program product of claim 10, wherein the identifying a first edited version of the first time segment comprises:
identifying a first set of segments in the stored audio file;
determining that the first edited version of the first time segment corresponds to an original version of the first time segment in the first version of the audio file; and
detecting that the first edited version of the first time segment is not identical to the original version of the first timestamp.

* * * * *